Figure 1:
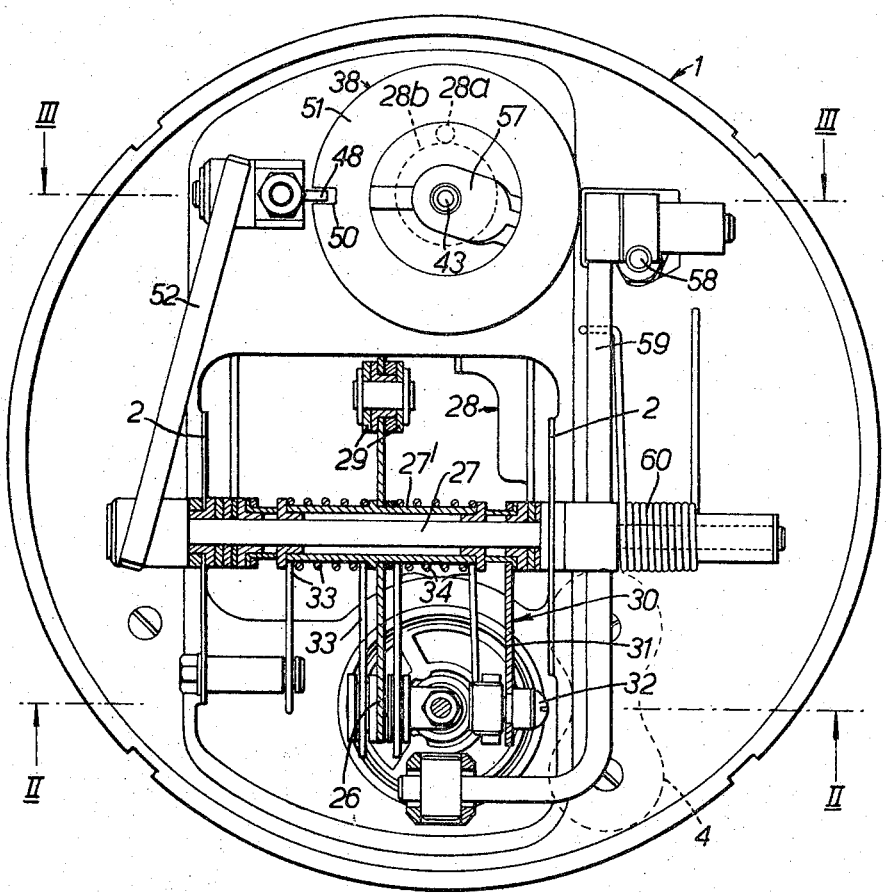

Nov. 21, 1967  F. H. GARDNER  3,353,535
ANESTHETIC AND ANALGESIC INHALER APPARATUS
Filed Oct. 30, 1964  5 Sheets-Sheet 1

INVENTOR

FRANK HENRY GARDNER

By
ATTORNEY

Nov. 21, 1967  F. H. GARDNER  3,353,535
ANESTHETIC AND ANALGESIC INHALER APPARATUS
Filed Oct. 30, 1964
5 Sheets-Sheet 2

INVENTOR
FRANK HENRY GARDNER
BY
ATTORNEY

Nov. 21, 1967   F. H. GARDNER   3,353,535
ANESTHETIC AND ANALGESIC INHALER APPARATUS
Filed Oct. 30, 1964   5 Sheets-Sheet 3

INVENTOR

FRANK HENRY GARDNER

By *Melford L. Pietz*
ATTORNEY

Nov. 21, 1967  F. H. GARDNER  3,353,535
ANESTHETIC AND ANALGESIC INHALER APPARATUS
Filed Oct. 30, 1964  5 Sheets-Sheet 5

INVENTOR
FRANK HENRY GARDNER
BY
ATTORNEY

United States Patent Office 3,353,535
Patented Nov. 21, 1967

3,353,535
ANESTHETIC AND ANALGESIC INHALER APPARATUS
Frank Henry Gardner, Botley, England, assignor to Air Reduction Company, Incorporated, New York, N.Y., a corporation of New York
Filed Oct. 30, 1964, Ser. No. 407,793
11 Claims. (Cl. 128—188)

The invention concerns improvements relating to anesthetic and analgesic inhaler apparatus of a type, hereinafter referred to as of the type described, comprising a vaporising chamber to contain liquid agent for producing anesthetic or analgesic vapour to be inhaled by the patient, and equally suitable for use as a "draw over" inhaler or as a vaporiser in a plenum circuit.

By a "draw over" inhaler is to be understood an inhaler through which the patient himself inhales thereby to cause evaporation of the liquid agent into the air or other gas being inhaled. By vaporisers for use in plenum circuits is to be understood a vaporiser which is fed with medical gases, etc., under pressure independently of the patient's breathing.

In either case, variations in flow rate may occur, and the apparatus is intended to avoid any consequent variations in vapour concentration from a selected value.

In order to cause evaporation of the liquid in the vapour chamber a known arrangement is to provide capillary active material (i.e. wick material) in the chamber which dips into free liquid contained in the chamber. The gas e.g. air is drawn into the chamber by the patient, through inlet means to the chamber, and flows through the chamber to outlet means from the chamber, the air flow carrying off from the chamber through the outlet means vapour evaporated from the wick material, this air/vapour being mixed in controlled manner with diluting air which by-passes the vaporising chamber to achieve a desired concentration.

United States patent application Ser. No. 229,435 (F. H. Gardner et al.), now Patent No. 3,162,192, relates to apparatus of the type described comprising a valve at an outlet of the vaporising chamber, means for diluting with by-pass gas the gas/vapour from the vaporising chamber, control means adjustable to give a chosen vapour concentration to the patient by varying the valve opening, and means responsive to temperature in the vaporising chamber acting on the control means to vary the valve opening. The control means is adaptable to the use of various agents, and the control means varies the valve opening in response to the gas/vapour temperature according to a predetermined relationship of these two variable functions for a chosen vapour concentration and agent.

According to a feature of said application the control means includes, interchangeably for each agent, a three-dimensional cam of generally cone shape, the line along the cam surface defining an axial section on any radius constituting a characteristic curve of the said function relationship. The control means can then be manually adjusted to give the chosen vapour concentration by rotation of the cam about its longitudinal axis, and a cam follower is constrained to move over the cam surface along the characteristic curve for that concentration. Suitably, the longitudinal movement of the cam follower is derived from the temperature responsive means and the consequent radial movement is transmitted to the valve at the vaporising chamber outlet to vary its opening.

According to the present invention, in such apparatus the cam interchangeable for each agent also adjusts a gas by-pass control member to a position appropriate to the particular agent.

Thus according to one aspect of the invention such apparatus comprises a vaporising chamber to contain liquid agent for producing vapour, a valve at an outlet of said chamber, means for diluting with by-pass gas the gas/vapour from said chamber including a gas by-pass control member, control means which includes a cam means interchangeable for each agent and which is adjustable to give a chosen vapour concentration by varying said outlet valve opening, and means actuable by said interchangeable cam means to adjust said by-pass control member to a position appropriate to the particular agent.

According to another aspect of the invention such apparatus comprises a vaporising chamber to contain liquid agent for producing vapour, a valve at an outlet of said chamber, means for diluting with by-pass gas the gas/vapour from said chamber including a gas by-pass control member, temperature responsive means in said chamber, control means which includes a cam means interchangeable for each agent and which is adjustable by said temperature responsive means to give a chosen vapour concentration by varying said outlet valve opening in response to the gas-vapour temperature according to a predetermined relationship of these two variables for a chosen vapour concentration and agent as defined by said cam means, and means actuable by said interchangeable cam means to adjust said by-pass control member to a position appropriate to the particular agent.

The cam means may have a predetermined length for appropriate actuation of said means to adjust said by-pass control member.

A second gas by-pass control member may be secured to the vaporising chamber outlet valve for movement therewith and so as to co-act with the first said gas by-pass control member, to provide according to the outlet valve opening optimum gas by-pass flow characteristics as predetermined for the particular agent; advantageously adjustable and alternative tubular orifice or plate orifice characteristics.

Figure 1A:
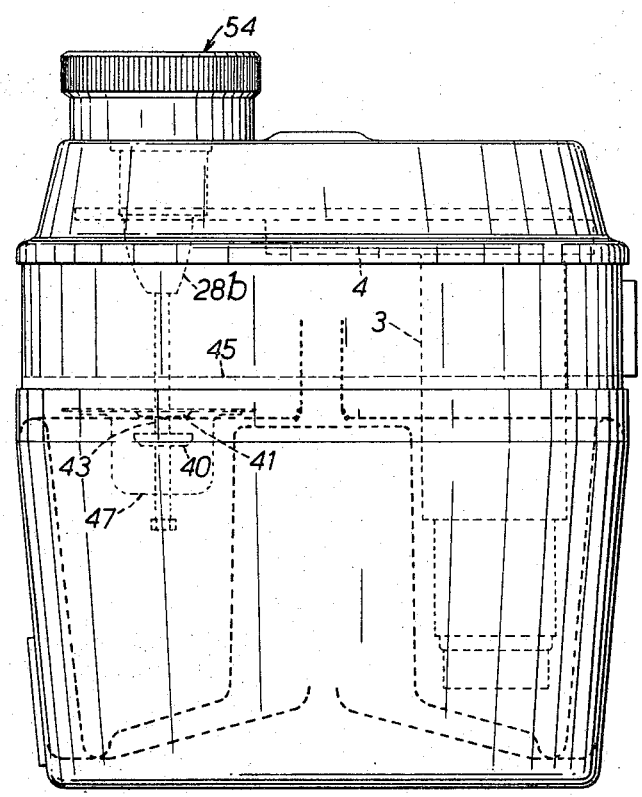
Figure 2:
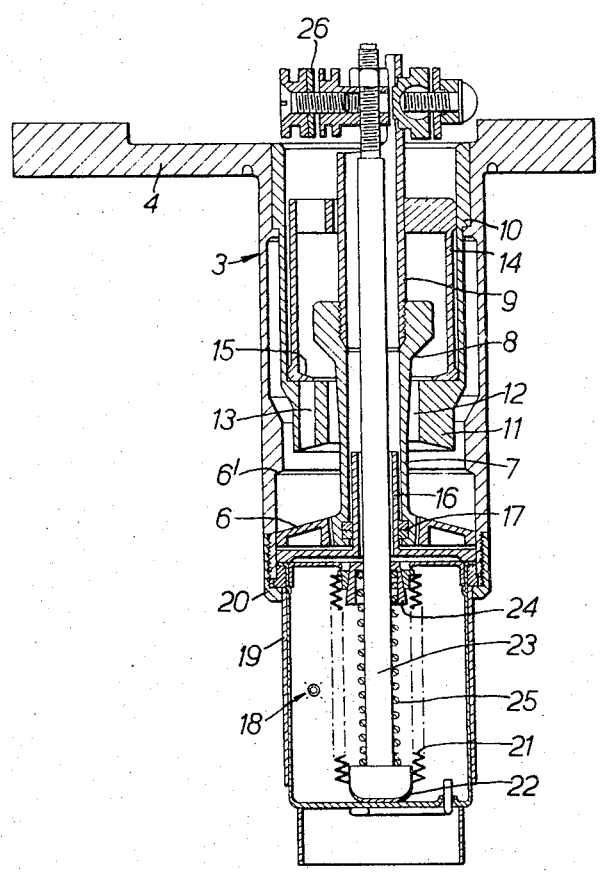
Figure 3:
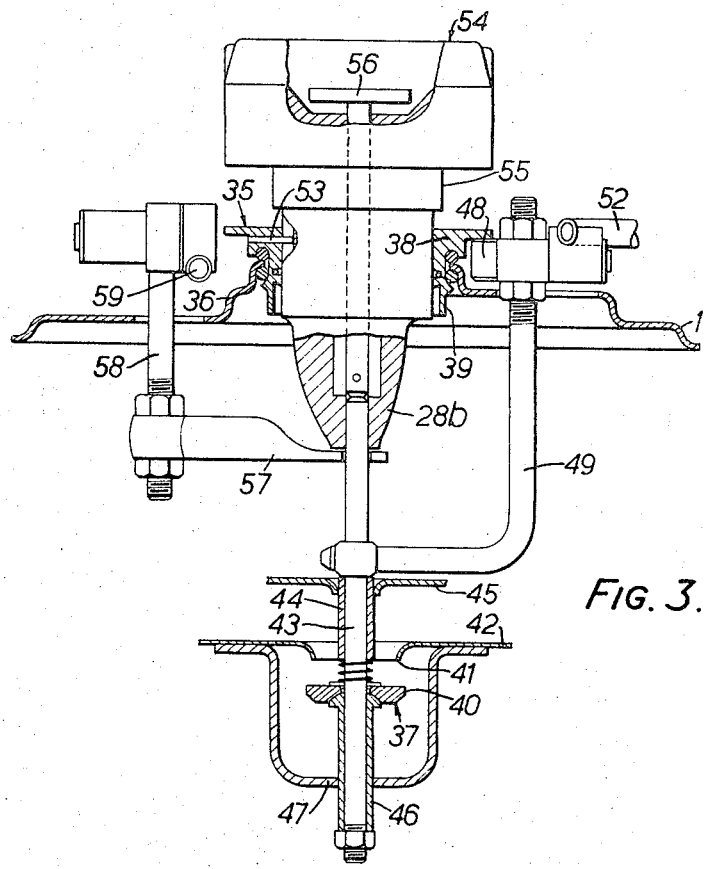
Figure 4:
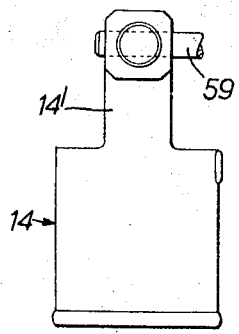
Figure 5:
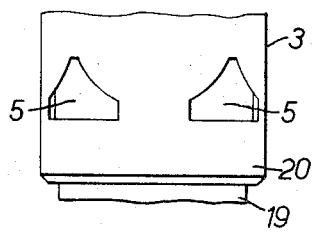

An embodiment of an apparatus according to the invention is hereinafter described by way of example with reference to the accompanying drawings in which:

FIG. 1 is a plan view of the control mechanism and its mounting plate for location in the balancer chamber of the apparatus above the vaporising chamber, FIG. 1A is a side view of a vaporiser device illustrating in dotted lines the relationship of portions of the internal construction of the vaporiser, FIG. 2 is a part-section on line II—II in FIG. 1, being an axial section of the outlet valve assembly, FIG. 3 is a part-section on line III—III in FIG. 1, being an axial section through the vaporising chamber inlet valve and cam plug assembly, FIG. 4 is a side elevation of the first gas e.g. air by-pass control member showing attachment to its actuating arm, FIG. 5 is a scrap view to show the ports in an outlet valve mounting tube, and FIGS. 6 to 11 illustrate various relationships between the two co-acting air by-pass control members and the outlet valve position, for different liquid agents.

The apparatus is basically similar to that described in said application. Thus briefly it comprises a lower open-topped casing, an intermeidate casing or mid-body and a cover on the mid-body, the outer form of the inhaler being generally cylindrical. The lower casing comprises a jacket filled with a heat transfer fluid, e.g. water, to surround the vaporising chamber defined therein beneath the mid-body. The vaporising chamber contains a ring channel, into which is introduced a chosen liquid agent through a filler housing, and also baffle plates and capillary active means.

The mid-body, which is clamped onto the lower casing with interposition of a ring seal, presents a mixing chamber well for the outlet valve of the vaporising chamber diametrically opposite the vaporising chamber inlet valve. In the mixing chamber, air/vapour from the vaporising chamber is to be mixed with by-pass air. A cross tube built into the mid-body extends therethrough to one side of the axis of the body, and normal to such main diametric plane containing the valve axes. The cross tube opens into the mixing chamber well and into the mid-body or balancer chamber. Hose connectors and sleeves are located interchangeably in the open ends of the cross tube to provide for reversal of the gas intake and outlet directions.

The outlet valve opening is regulated by a temperature sensitive unit, depending into the vaporising chamber below the outlet valve, by way of a control mechanism including a parallelogram linkage lever assembly and cam follower constrained to move over a cam plug which is interchanged according to the liquid agent being used. The cam plug is received in a cam plug guide assembly rotatably mounted in the balancer chamber co-axially above the vaporising chamber inlet valve.

Each cam plug comprises a three-dimensional cam of generally cone shape. The shape of the cam surface is fashioned so that the line along the cam surface defining an axial section on any radius constitutes a characteristic curve or graph of the vaporising chamber outlet valve opening plotted against the air/vapour temperature, for the given agent at a certain vapour concentration to the patient. Initially the characteristic curves are plotted empirically and the cam surface shape fashioned accordingly. Longitudinal movement of the cam follower which is constrained to follow the cam surface, is derived through a temperature function lever of the parallelogram linkage assembly from the temperature responsive unit and the consequent radial movement of the follower is transmitted through a bell crank lever assembly of the parallelogram linkage assembly to vary the opening of the outlet valve from the vaporising chamber according to the predetermined characteristic at the chosen vapour concentration to the patient so as to maintain that concentration for varying temperature within the vapour chamber.

All of the above features may be substantially as described in said application.

The present modifications will now be described in relation to the above background.

A mounting plate 1 for the control mechanism is adapted to be secured in the mid-body or balancer chamber of the vaporiser, and presents two parallel vertical plates 2 extending in spaced relation across the plate 1, which is suitably cut out, and parallel with said diametrical plane containing the valve axes.

An outlet valve mounting tube 3 is secured by an upper horizontal flange 4 beneath the mounting plate 1, so that the tube extends downwards through the mixing chamber well in the mid-body, with gas tight sealing, and projects into the vaporising chamber. The tube 3 presents lateral outlet valve ports 5, of special regulating configuration, towards its lower end which co-operate with an outlet valve piston 6 sliding axially within the tube. The piston 6 is secured on to the lower end of a piston tube 7, which is specially formed as one air by-pass control member 8, into the upper end of which is screwed a hollow valve post 9 extending upwards for connection with the control mechanism. The mounting tube 3 carries towards its upper end a co-axial inner tube 10 which at its lower end presents a radially inward shoulder 11 surrounding the piston tube 7 with an annular gap 12 therebetween, which gap presents the characteristics of a tubular orifice. An air by-pass 13 in parallel with such tubular orifice 12 extends axially through the shoulder 11. Another air by-pass control member or restrictor 14 is tubular and slides axially between the inner tube 10 and the valve post 9, its upper end being of web form to allow air passage and its lower end presenting a radially inward lip 15 adapted to seat over and close the by-pass 13 and also to co-act with the other air by-pass control member 8, as later explained. A portion 14' of the restrictor 14 extends upwards for connection with the control mechanism.

At the lower end of the mounting tube 3 a piston guide 16 is located to co-operate with a sealing ring 17 carried in the piston tube 7. A temperature sensitive unit 18 is located beneath the guide 16 and carries a wick sleeve 19, the guide and unit being secured to the tube 3 by a shouldered nut 20 screwed on to the tube end. The unit 18 is of generally known kind comprising a metal bellows 21 attached at its upper end to the unit container and with its lower end wall assembly or pad 22 movable vertically from the bottom of the container, the space within the container between the container walls and the bellows being filled with an expansion liquid. Such a unit is described in said application.

A control mechanism actuating thrust rod 23 extends upwardly from the pad 22 through a thrust rod guide 24 located at the top of the unit 18, the guide 16, piston tube 7 and hollow valve post 9. A coil compression spring 25 surrounds the thrust rod and acts between the guide 24 and the pad 22 to urge the latter downwards. The top of the valve post is partially cut away to provide access to the upper end of the thrust rod.

The upper end of the thrust rod 23 is pivotally connected to one end of a temperature function lever 26 which rocks centrally by way of a sleeve 27' on a main cross shaft 27 borne transversely by the mounting plates 2. The lever 26 forms one side of a parallelogram linkage, the parallel member of the linkage being a cam follower lever assembly 28, not fully shown, carrying the cam follower ball 28a to co-act with the three-dimensioned cam plug 28b. A linkage 29 pivotally connects the other end of the temperature function lever 26 to the cam follower lever assembly 28. One arm of a bell crank lever assembly 30 is parallel with said linkage 29 and is also pivotally connected to the cam follower lever assembly, the bell crank lever assembly being free to pivot about the main cross shaft 27. The other arm 31 of the bell crank lever assembly carries a ball-ended screw 32 engaging in the outlet valve post 9.

Operation of the bell crank lever assembly and cam follower lever assembly is basically as described in said application.

A torsion spring 33 located around the cross shaft sleeve to one side of the temperature function lever 26 is arranged to urge the thrust rod 23 from the temperature sensitive unit downwards. A similar torsion spring 34 to the other side of such lever is arranged to urge the outlet valve post 9 upwards and the thrust rod 23 downwards, so as to close the outlet valve piston 6 upwardly against its seating 6' in the mounting tube 3.

A cam plug guide assembly 35 is rotatably mounted in a shouldered ring 36 formed in the mounting plate 1, the guide and ring being co-axial with the air inlet valve 37 to the vaporising chamber. The guide assembly comprises upper and lower annular members 38, 39 as detailed in said application.

The inlet valve 37 comprises a sealing disc 40 which co-operates with a seating 41 in the mid-body floor 42. The valve stem 43 carrying an anti-friction sleeve 44 extends upwards through the mid-body floor 42 and a superior baffle plate 45. The valve stem 43 extends downwards through the valve disc 40 which is located thereon above a sleeve 46 secured at the lower end of the stem and axially slidable with the stem, through a guide bracket 47. The valve is urged by a spring to its closed position upwardly against its seating.

In one limiting or "off" position of the rotationally mounted cam guide 35, a stop 48 carried by a cranked connecting rod 49 from the inlet valve stem 43 engages in a radial slot 50 in the peripheral flange 51 of the upper guide member 38. The inlet valve is closed by its spring in such position of the guide. A steady arm 52 for the stop is pivotally mounted at one end to the stop and at the other end on an extension of the main cross shaft 27.

A radial pin 53 in the upper guide member 38 of the cam guide assembly is received in a keyway in the interchangeable cam plug 54, with which the parallelogram linkage control assembly co-operates by way of the cam follower assembly, in the manner described above.

Each cam plug 54 may be basically of the form described in said application, being inserted into the cam guide assembly through an opening in the mid-body cover with a suitable ring seal engaging around a skirt 55 of the cam plug. A headed plunger 56 of the cam plug is slidable axially therethrough and engages the top of the inlet valve stem 43, over which the lower end of the cam plug fits.

The lower end of the cam plug is arranged to co-operate with a finger 57 which presents a hole through the valve stem 43 passes and which is mounted for vertical movement by means of a drop arm 58 pivotally attached to one end of a control lever beam 59 which is in turn fulcrummed on an extension of the main cross shaft 27. The other end of the beam 59 is cranked to pivotally engage with the upwardly extending portion 14' of the restrictor 14. A torsion spring 60 surrounds the cross shaft extension to urge the finger 57 upwards and the restrictor 14 downwards. Thus the length of each cam plug can be selected to adjust automatically the restrictor to a predetermined position for each particular liquid agent.

The setting up and automatic control of the inhaler by way of the interchangeable cam plug and control mechanism is basically as described in said application.

However, there is a special control of the by-pass or diluting air which passes from the mid-body or balancer chamber to intermingle with the air/vapour entering the mixing chamber from the outlet valve of the vaporising chamber. The mixing chamber is defined at 61 between the outlet valve piston 6 and the lower end of the inner tube 10. From the mixing chamber the mixture passes up between the walls of the inner and outer tubes 10, 3 and thence through ports 62 in the tube 3 into the cross tube of the mid-body and out of the respective hose connector and sleeve to the patient.

FIGS. 6–11 illustrate the manner of controlling the by-pass air for different liquid agents.

Figure 6:
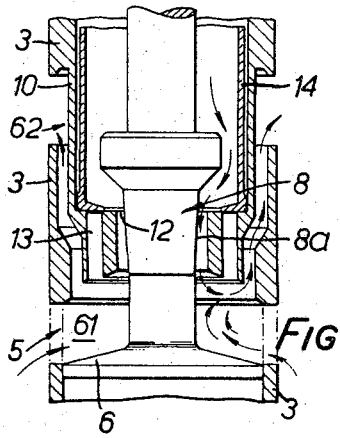
Figure 7:
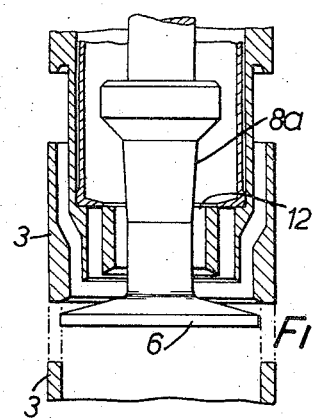

FIGS. 6 and 7 show the relations between the restrictor 14 and control member 8 for fully open and nearly closed positions of the outlet valve respectively, adopting one setting of the restrictor 14 closing the by-pass 13. In this case the cam plug length is made such as not to depress the finger 57. Such a setting is suited e.g. to the agent "Halothane." In the fully open valve position, by-pass air passes through the tubular orifice 12 which is at a minimum opening due to the position of the cone form 8a of the control member 8, thence to mix with the air/vapour from the vaporising chamber and pass on to the patient as explained above. In the nearly closed valve position, again by-pass air passes through the tubular orifice 12 which is now at a near maximum opening due to the position of the higher position of the cone form 8a which moves with the valve.

Figure 8:
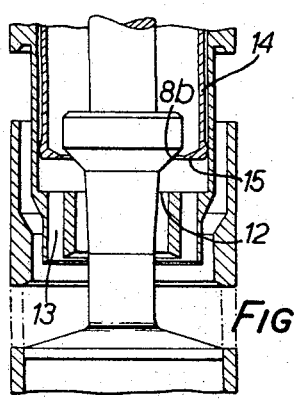
Figure 9:
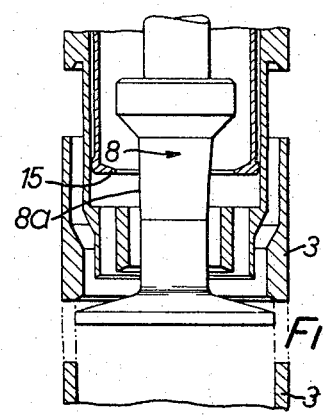

FIGS. 8 and 9 show fully open and nearly closed positions of the outlet valve respectively, with the restrictor 14 set, by an appropriate cam plug length, to an intermediate position opening the by-pass 13. Such setting is suited e.g. to the agent ether. In the fully open valve position, the by-pass air encounters the characteristics of a plate orifice operating at a minimum opening, as defined between the lip 15 of the restrictor 14 and the cone form 8b of the control member 8. The by-pass 13 being open deletes the characteristics of the tubular orifice 12 which is in use as a passage only. In the near closed valve position, the plate orifice is defined at a near maximum opening between the lip 15 and cone form 8a of the control member 8.

Figure 10:
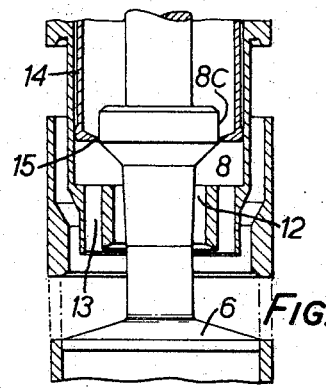
Figure 11:
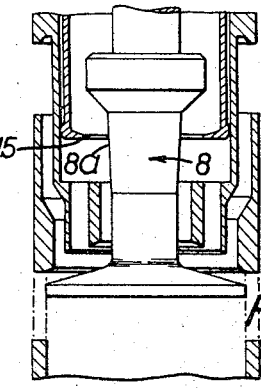

FIGS. 10 and 11 show fully open and nearly closed valve positions respectively, with the restrictor 14 set, again by another appropriate cam plug length, to a higher, near fully raised, position also opening the by-pass 13. Such setting is suited e.g. to the agent "Penthrane." In the fully open valve position, the plate orifice at lip 15 is closed except for a predetermined leak between lip 15 and cylinder form 8c of the control member 8. The by-pass 13 and tubular orifice 12 act simply as passages as for FIGS. 8 and 9. In the near closed valve position, the plate orifice is defined at a predetermined opening between the lip 15 and cone form 8a of the control member 8.

For all cases, the restrictor settings and dimensions of the effective tubular or plate orifices are determined so as to contribute to the overall desired effect that for each agent and under varying flow rates, respiration rates and depths of respiration, the concentration of the inhaled mixture remains constant as set by the cam plug due inter alia to the automatic variation of the outlet valve opening.

As in said application, the air by-passes and outlet valve openings are arranged symmetrically with respect to the mixture chamber outlet path, so that reversal of the flow along the intake/outlet cross tube would not affect the flow characteristics.

I claim:

1. Anesthetic and analgesic inhaler apparatus comprising a vaporizing chamber to contain liquid agent for producing vapor, a valve at an outlet of said chamber, means for diluting with by-pass gas the gas/vapor from said chamber including a gas by-pass control member, control means which includes a cam means interchangeable for each agent and which is adjustable to give a chosen vapor concentration by varying said outlet valve opening; means actuable by said interchangeable cam means to adjust said by-pass control member to a position appropriate to the particular agent, and a second gas by-pass control member secured to said outlet valve for movement therewith and so as to co-act with the first said by-pass control member to provide according to said outlet valve opening optimum gas by-pass flow characteristics as predetermined for the particular agent.

2. Apparatus according to claim 1 wherein said diluting means including said first and second by-pass control members provides adjustable and alternative tubular orifice and plate orifice characteristics.

3. Apparatus according to claim 2 wherein a mixing chamber well is located above the outlet valve, an outlet valve mounting tube extends through said well and projects into the vaporising chamber, an outlet valve piston slides axially within the tube and co-operates with lateral ports presented by the tube, said second by-pass control member is secured above said piston, a co-axial inner tube is carried by the mounting tube and presents a radially inward shoulder surrounding said second control member with a variable annular gap therebetween to present the characteristics of a tubular orifice.

4. Apparatus according to claim 3 wherein a fixed gas by-pass in parallel with such tubular orifice extends axially through said shoulder.

5. Apparatus according to claim 4 wherein said first by-pass control member is tubular, is slidable axially within said inner tube, and presents a radially inward lip adapted to seat over and close said fixed by-pass and to surround said second control member with a variable annular gap therebetween to present the characteristics of a plate orifice.

6. Apparatus according to claim 1 wherein said cam means has a predetermined length for appropriate actuation of said means to adjust said by-pass control member.

7. Anesthetic and analgesic inhaler apparatus comprising a vaporizing chamber to contain liquid agent for producing vapor, a valve at an outlet of said chamber, means for diluting with by-pass gas the gas/vapor from said chamber including a gas by-pass control member, temperature responsive means in said chamber, control means which includes a cam means interchangeable for each agent and which is adjustable by said temperature responsive means to give a chosen vapor concentration by varying said outlet valve opening in response to the gas/vapor temperature according to a predetermined relationship of these two variables for a chosen vapor concentration and agent as defined by said cam means, means actuable by said interchangeable cam means to adjust said by-pass control member to a position appropriate to the particular agent, said cam means including three dimensional cam of generally cone shape of which the line along the cam surface defining an axial section on any radius constitutes a characteristic curve of said function relationship, said cam means being manually rotatable about its longitudinal axis to select a desired vapor concentration, and said means to adjust said by-pass control member including a control lever mechanism and said cam having a predetermined length for appropriate actuation of said lever mechanism.

8. Apparatus according to claim 7 wherein said control lever mechanism presents a finger to be depressed by a lower end of the cam.

9. Anesthetic and analgesic inhaler apparatus comprising a vaporizing chamber to contain liquid agent for producing vapor, a valve at an outlet of said chamber, means for diluting with by-pass gas the gas/vapor from said chamber including a gas by-pass control member, temperature responsive means in said chamber, control means which includes a cam means interchangeable for each agent and which is adjustable by said temperature responsive means to give a chosen vapor concentration by varying said outlet valve opening in response to the gas/vapor temperature according to a predetermined relationship of these two variables for a chosen vapor concentration and agent as defined by said cam means, means actuable by said interchangeable cam means to adjust said by-pass control member to a position appropriate to the particular agent, and a second gas by-pass control member secured to said outlet valve for movement therewith so as to coact with the first said by-pass control member to provide adjustable and alternative tubular orifice and plate orifice by-pass flow characteristics as determined for the particular agent according to the setting of said first and second control members by said cam means and said outlet valve respectively.

10. Apparatus according to claim 9 wherein an outlet valve mounting tube projects into the vaporising chamber, an outlet valve piston slides axially within the tube and co-operates with lateral ports presented by the tube, said second by-pass control member is secured above said piston, a coaxial inner tube is carried by the mounting tube and presents a radially inward shoulder surrounding said second control member with a variable annular gap therebetween to present the characteristics of a tubular orifice.

11. Apparatus according to claim 10 wherein a fixed gas by-pass in parallel with such tubular orifice extends axially through said shoulder, and said first by-pass control member is tubular, is slidable axially within said inner tube, and presents a radially inward lip adapted to seat over and close said fixed by-pass and to surround said second by-pass control member with a variable annular gap therebetween to present the characteristics of a plate orifice.

References Cited

UNITED STATES PATENTS

| | | | |
|---|---|---|---|
| 2,206,688 | 7/1940 | Bloomheart | 128—186 |
| 2,553,446 | 5/1951 | Edmonson et al. | 128—188 |
| 2,941,528 | 6/1960 | Fabian et al. | 128—188 |
| 2,989,950 | 6/1961 | Lockman | 137—85 X |
| 3,156,238 | 11/1964 | Bird et al. | 128—188 X |
| 3,162,192 | 12/1964 | Gardner et al. | 128—188 |
| 3,172,405 | 3/1965 | Sugg | 128—188 |
| 3,263,974 | 8/1966 | Braun et al. | 261—50.1 X |

RICHARD A. GAUDET, *Primary Examiner.*

K. L. HOWELL, *Assistant Examiner.*